United States Patent
Iyengar et al.

(10) Patent No.: US 8,771,835 B2
(45) Date of Patent: Jul. 8, 2014

(54) SUBSTANTIALLY BIODEGRADABLE AND COMPOSTABLE HIGH-BARRIER PACKAGING MATERIAL AND METHODS FOR PRODUCTION

(75) Inventors: Gopal Iyengar, Stevens Point, WI (US); Thomas Borchardt, Middleton, WI (US); Gerald Lowe, Wisconsin Rapids, WI (US)

(73) Assignee: NewPage Wisconsin System, Inc., Miamisburg, OH (US)

( * ) Notice: Subject to any disclaimer, the term of this patent is extended or adjusted under 35 U.S.C. 154(b) by 974 days.

(21) Appl. No.: 12/377,211

(22) PCT Filed: Jun. 6, 2008

(86) PCT No.: PCT/US2008/066130
§ 371 (c)(1),
(2), (4) Date: Feb. 11, 2009

(87) PCT Pub. No.: WO2009/005947
PCT Pub. Date: Jan. 8, 2009

(65) Prior Publication Data
US 2010/0178523 A1 Jul. 15, 2010

Related U.S. Application Data

(60) Provisional application No. 60/958,225, filed on Jul. 3, 2007, provisional application No. 60/963,703, filed on Aug. 7, 2007.

(51) Int. Cl.
*B32B 29/00* (2006.01)
*B32B 27/10* (2006.01)
*B32B 15/08* (2006.01)
*B05D 7/14* (2006.01)

(52) U.S. Cl.
USPC ........ 428/458; 428/457; 428/537.5; 428/530; 428/491; 428/211.1

(58) Field of Classification Search
USPC .................. 428/457, 458, 530, 211.1, 437.5
See application file for complete search history.

(56) References Cited

U.S. PATENT DOCUMENTS 2,161,595 A * 6/1939 Stiner ............................. 312/31
3,257,234 A * 6/1966 Porter et al. ................. 427/338

(Continued)

FOREIGN PATENT DOCUMENTS

DE 44 45 193 A1 7/1995

OTHER PUBLICATIONS

The International Search Report and The Written Opinion of the International Searching Authority, received in the corresponding PCT application (PCT/US08/66130), dated Aug. 29, 2008.

(Continued)

*Primary Examiner* — Samir Shah
(74) *Attorney, Agent, or Firm* — Greer, Burns & Crain, Ltd

(57) ABSTRACT

Bio-degradable, high-barrier packaging materials and methods for production are provided. The present high-barrier packaging materials include a substrate having a print side and a back side, a coating having nano pigments on the print side and a metalized film applied to the back side with a binding layer. Preferably, at least one of the metalized film and the binding layer includes polylactic acid. Moreover, the back side preferably also includes a polylactic acid heat seal layer.

8 Claims, 5 Drawing Sheets

(56) References Cited

U.S. PATENT DOCUMENTS

| | | | |
|---|---|---|---|
| 3,663,240 A | 5/1972 | Seiferth et al. | |
| 4,254,173 A | 3/1981 | Peer, Jr. | |
| 4,387,126 A | 6/1983 | Rebholz | |
| 4,983,431 A | 1/1991 | Gibbons et al. | |
| 5,556,711 A * | 9/1996 | Ajioka et al. | 428/460 |
| 5,562,980 A | 10/1996 | Koutitonsky | |
| 5,599,596 A | 2/1997 | Sandvick et al. | |
| 5,603,996 A | 2/1997 | Overcash et al. | |
| 5,631,078 A | 5/1997 | Ellery et al. | |
| 5,693,416 A | 12/1997 | Kucherovsky | |
| 5,766,748 A * | 6/1998 | Ikado et al. | 428/220 |
| 5,849,128 A | 12/1998 | Kobinata et al. | |
| 5,935,664 A | 8/1999 | Claytor et al. | |
| 5,948,546 A | 9/1999 | Bafford et al. | |
| 6,007,666 A | 12/1999 | Bunch et al. | |
| 6,013,363 A | 1/2000 | Takahashi et al. | |
| 6,333,086 B1 | 12/2001 | Ora et al. | |
| 6,358,576 B1 | 3/2002 | Adur et al. | |
| 6,503,634 B1 | 1/2003 | Utz et al. | |
| 6,545,079 B1 | 4/2003 | Nurmi et al. | |
| 6,652,984 B2 | 11/2003 | Firestone et al. | |
| 6,677,013 B1 | 1/2004 | Curie et al. | |
| 6,677,048 B2 | 1/2004 | Karhuketo et al. | |
| 6,709,757 B2 | 3/2004 | Utz et al. | |
| 6,720,097 B2 | 4/2004 | Ohkawa et al. | |
| 6,767,600 B1 | 7/2004 | Kasahara | |
| 6,787,245 B1 * | 9/2004 | Hayes | 428/480 |
| 6,821,373 B1 | 11/2004 | Berlin et al. | |
| 6,852,422 B2 | 2/2005 | Kendall et al. | |
| 6,872,459 B1 | 3/2005 | Frisk | |
| 7,128,210 B2 | 10/2006 | Razetin et al. | |
| 7,132,490 B2 | 11/2006 | Obuchi et al. | |
| 7,235,308 B2 | 6/2007 | Druckrey et al. | |
| 2002/0127358 A1 | 9/2002 | Berlin et al. | |
| 2003/0165783 A1 * | 9/2003 | Nishio | 430/440 |
| 2003/0203989 A1 * | 10/2003 | Rao et al. | 523/200 |
| 2003/0205319 A1 | 11/2003 | Bengtson et al. | |
| 2003/0232211 A1 | 12/2003 | Kendall et al. | |
| 2004/0086737 A1 | 5/2004 | Yockey | |
| 2004/0091585 A1 * | 5/2004 | Theisen et al. | 426/124 |
| 2004/0157516 A1 | 8/2004 | Penttinen et al. | |
| 2004/0191541 A1 * | 9/2004 | Squier et al. | 428/458 |
| 2004/0241475 A1 | 12/2004 | Morabito | |
| 2005/0008800 A1 | 1/2005 | Andersson et al. | |
| 2005/0037162 A1 | 2/2005 | Adams | |
| 2005/0067127 A1 | 3/2005 | Frisk et al. | |
| 2005/0074621 A1 | 4/2005 | Reighard et al. | |
| 2005/0145138 A1 | 7/2005 | Raju et al. | |
| 2005/0151296 A1 | 7/2005 | Obuchi et al. | |
| 2005/0158530 A1 | 7/2005 | Trautwein et al. | |
| 2005/0159583 A1 * | 7/2005 | Imamura et al. | 528/422 |
| 2005/0163944 A1 * | 7/2005 | Isshiki et al. | 428/32.39 |
| 2005/0199359 A1 | 9/2005 | Furuheim | |
| 2006/0013972 A1 | 1/2006 | Nishiyama et al. | |
| 2006/0246242 A1 | 11/2006 | Siegel et al. | |
| 2006/0275563 A1 | 12/2006 | Duffy | |
| 2006/0292323 A1 * | 12/2006 | Hutchinson et al. | 428/36.91 |
| 2007/0110932 A1 | 5/2007 | Castillo et al. | |
| 2007/0184220 A1 | 8/2007 | Cleveland et al. | |

OTHER PUBLICATIONS

Machine translation of DE 44 45 193 A1.

* cited by examiner

SUBSTANTIALLY BIODEGRADABLE AND COMPOSTABLE HIGH-BARRIER PACKAGING MATERIAL AND METHODS FOR PRODUCTION

PRIORITY

This application claims priority from pending U.S. Provisional Patent Application Ser. No. 60/958,225 filed Jul. 3, 2007 and pending U.S. Provisional Patent Application Ser. No. 60/963,703 filed Aug. 7, 2007, the subject matter of both of which are incorporated herein by reference.

TECHNICAL FIELD

The present invention relates to high-barrier packaging materials. More particularly, the present invention relates to high-barrier packaging materials including a substrate, coating and metalized film. Even more particularly, the present invention relates to high-barrier packaging materials having a metalized cellophane or metalized polylactic acid film and a polylactic acid heat seal layer.

BACKGROUND OF THE INVENTION

High-barrier packaging materials find particular application in the food industry, including for example, bags, pouches and cups for storing food products for human or animal consumption. A high-barrier packaging material is defined as providing very low transmission rates for water vapor and oxygen gas at both standard and tropical conditions. Packages having low water vapor and oxygen transmission rates are linked to extended life of food stored therein. Water vapor and oxygen transmission are accelerated at higher temperature and humidity (tropical conditions). They act as the main culprits in degradation of food stored in packages.

High-barrier packaging materials in use today include a combination of plastic polymer films and metal foils, manufactured by lamination and extrusion technologies. These types of plastic and foil based high-barrier packaging materials have high material costs, as compared to lower cost materials such a paper and paperboard. Further, these conventional high-barrier materials are not biodegradable or recyclable. Paper based packaging materials are desirable because they have comparatively low material costs, and are recyclable and biodegradable. However, paper and paperboard, being hygroscopic and porous are considered unsuitable for high-barrier applications.

There is a need for a high-barrier packaging material that has low transmission rates for water vapor and oxygen gas at both standard and tropical conditions and which is recyclable, substantially biodegradable and/or compostable.

SUMMARY OF THE INVENTION

In accordance with the invention on improved biodegradable high-barrier packaging material products and methods of manufacturing are provided. The present packaging material products comprise a substrate having a print side and a back side, a coating on the print side including nano pigments, and a metalized film layer laminated to the back side of the substrate with a bonding layer. The bonding layer may comprise an adhesive, a polylactic acid resin layer, and/or an extruded tie layer. The metalized film layer may comprise either metalized cellophane film or metalized polylactic acid film. A heat seal layer is provided either as part of the metalized film layer and/or by laminating a heat seal layer over the metalized film layer.

A method for forming a bio-degradable, high-barrier packaging material is provided. The method includes the steps of unwinding a metalized film from a first unwind station and unwinding a coated paper substrate from a second unwind station. The substrate includes a nano pigment coating on its print side. A bonding layer is then applied to the metalized film. The metalized film is then laminated to the back side of the substrate to form a laminated web. A polylactic acid heat seal material is preferably extruded and laminated to the metalized film.

DETAILED DESCRIPTION OF AN EMBODIMENT OF THE INVENTION

Figure 1:
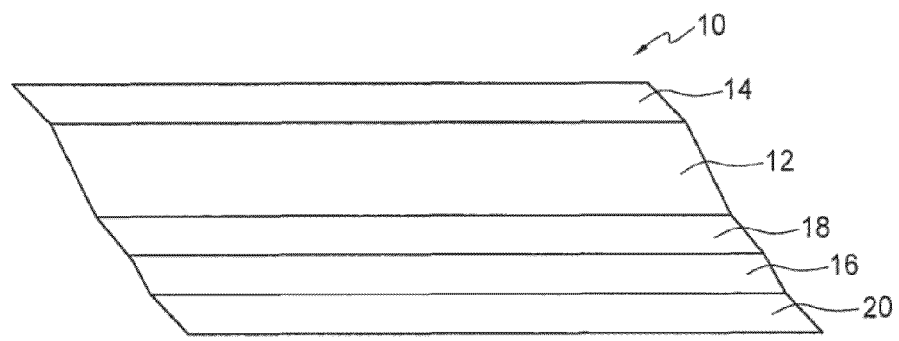
FIG. 1 is an enlarged cross-section of a first embodiment of the barrier material of the invention.

Referring now to the drawings where like features are identified by the same reference numerals, a first embodiment of a bio-based, high-barrier packaging material 10 of the invention includes a paper or paperboard substrate 12, a coating 14 having a nano pigment on the print side of the substrate, and a metalized film 16 laminated on the back side of the substrate with bonding layer 18. Film 16 is preferably a metalized polylactic acid (PLA) film, and alternatively can be a metalized cellophane film.

The substrate includes paper or paperboard formed by conventional paper making technology as is well known in the art. A preferred exemplary substrate is formed from a combination of about 40 percent softwood pulp, about 56 percent hardwood pulp, and about 4 percent base ash. The substrate has less than about 0.25 $nm^2$ permeability, and has less than about 30% total porosity as measured using modified porosimetry techniques. The substrate porosity is also controlled to provide more than about 20 secs of Gurley porosity on the paper machine.

Porosity is controlled by manipulating refining, which is done separately for both softwood and hardwood. For softwood, refining is typically achieved using a low intensity refining plate specific edge load of about 2.2 watt-second/ meter. For hardwood Kraft, low intensity refining is typically achieved using a low specific edge load of about 1.54 watt-second/meter. A mixed pulp of both hardwood and softwood is further refined, if necessary, with a medium intensity of about 1.84 watt-second/meter specific edge load using about 3-5 horsepower day/ton in a double-disc refiner. The substrate can have essentially any basis weight as may be required for different packaging applications, for example, from about 20 to about 55 pounds per 3,000 square foot ream.

A preferred substrate for packaging materials of the present invention is a pouch base substrate, for example, Point Flex pouch base, available from NewPage Corp., Stevens Point, Wis. Other substrates can be used in other embodiments of the present invention as would be appreciated by those skilled in the art.

At least one side, preferably the print side, of the substrate is machine glazed. As a result, the print side has a very smooth surface with good coating lay-down.

Coating 14 is applied to the print side of the substrate. The coating 14 includes a one or more pigments at least one of which is a nano pigment, and one or more binders. At least about 25% by dry weight of the total pigment comprises one or more nano pigments. The remaining pigments may include generic clays and generic talcs. A nano pigment is defined as a pigment having no greater than about 90 nanometers in dimension. Preferably, the nano pigment has a high aspect ratio (i.e., the pigment particles are platy, being very thin with a high surface area) which is equal to or greater than about 90:1 and more preferably about 100:1. The nano pigments pack to form a dense structure with low porosity, which enhances the water and oxygen barrier properties of the sheet. Increasing the amount of high aspect ratio pigments provides a higher level of tortuosity and further improves the barrier properties of the packaging material. Preferably, the coated paper of the invention has a permeability less than about 0.15-0.2 nm$^2$ to provide good water vapor transmission rate barrier properties.

Suitable high aspect ratio nano pigments include nano clay, such as those available from Imerys, Inc. of Roswell, Ga., and hyperplatey nano talc, such as those available from Rio Tinto Minerals of Greenwood Village, Colo. Nano pigments that do not have a high aspect ratio may also be included in certain embodiments of the present packaging materials and include nano zinc oxide from Byk Chemie of Wesel, Germany, and nano titanium oxide from Millennium Inorganic Chemicals of Ashtabula, Ohio and Baltimore, Md.

The print side coating binder preferably includes a combination of a protein and polyvinyl alcohol. A preferred protein is a soy protein having a relatively medium molecular weight, such as Pro-Cote and Pro-Cote 200 available from The Solae Company, St. Louis, Mo. A preferred polyvinyl alcohol has a molecular weight of about 26,000 to 34,000 with a degree of polymerization of about 260-340. Polyvinyl alcohols for use in the present invention include Celvol 24-203, available from Celanese of Dallas, Tex. The combination of soy protein and polyvinyl alcohol exhibits improved film formation and is substantially fully biodegradable.

Alternatively, the binder may comprise a combination of low glass transition latex and polyvinyl alcohol. Latex is not bio-based, but has desirable high barrier properties and is substantially compostable and recyclable. Nano pigmented latex coatings may further reduce water vapor transmission rates, as compared to protein-based nano pigmented coatings. Other alternative binders comprise a mixture of ethylene acrylic acid and polyvinyl alcohol, or a mixture of ethylene acrylic acid and latex.

The print side coating 14 is preferably applied at a coat weight of about 5.5 to about 8 pounds per 3,000 square foot ream by a conventional blade or rod coater. The substrate and coating combination provides improved water vapor and oxygen barrier properties because the machine glazed substrate is smooth with a minimal amount of fibers protruding from the surface and the coating 14 includes nano pigments with a film forming binder that work together to desirably seal the surface.

Metalized film 16 is preferably a metalized polylactic acid (PLA) film that is extrusion or adhesive laminated onto the back side of the substrate. A suitable metalized PLA film 16 is 1 mil thick with a 22,100 in.$^2$/lb yield available from Celplast Metalized Products Limited, 67 Commander Blvd, Unit 4, Toronto, Canada M1S 3M7. Alternatively, a metalized cellophane film can be used. A preferred metalized cellophane film is 0.92 mils thick with a 21,000 in.$^2$/lb yield commercially available from Innovia Films, Inc., of Atlanta, Ga. The purpose of laminating a metalized film to the substrate is to further enhance the water vapor barrier properties of the packaging material to less than about 0.3 gms/100 inch$^2$/day at tropical conditions and still maintain the whole package as substantially biodegradable, compostable and/or renewable. The metalized cellophane film is substantially biodegradable and compostable. The metalized PLA film is biodegradable in the presence of water, and is compostable.

Metalized film 16 is laminated to the substrate 12 with a bonding layer 18. Bonding layer 18 can comprise an adhesive adapted for dry or wet lamination, an extruded PLA tie layer, or any other bio-degradable and/or compostable bonding layers suitable for bonding metalized film 16 to substrate 12. The bonding layer may incorporate optional high barrier additives. Adhesive can be applied at approximately 2 lbs per ream. A suitable adhesive for dry lamination is a water based adhesive, Aqualam 444A-CR100, available from Rohm & Haas of Ringwood, Ill. or 2D5414M available from Henkel of Elgin, Ill. Exemplary laminating adhesives include R200v3 and 31401W, developed by Ecosynthetix, Inc., of Lansing, Mich. The advantage of these exemplary laminating adhesives is that they are substantially or completely biodegradable and/or compostable. The alternate PLA resin layer 18 has a thickness between about 0.5 to about 4 mils, with about 1.5 being preferable. In addition to bonding the metalized film 16 to the substrate 12, a PLA resin bonding layer enhances the barrier properties of the laminated product.

A heat seal PLA layer 20 is extrusion laminated to the outer or backside of the film 16. A preferred film thickness is 1.5 mils. The heat seal layer is adapted to be heat sealed to itself or another compatible layer of packaging material. The heat seal PLA layer 20 also functions as a protective coating for metalized PLA film 16 and provides enhanced heat seal functionality.

Figure 2:
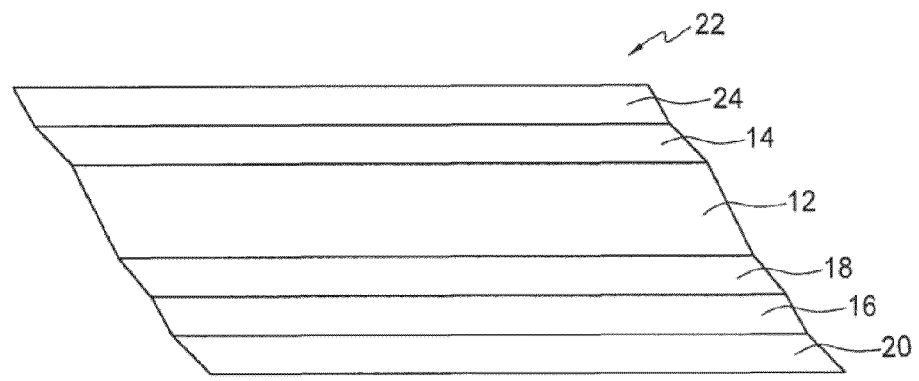
FIG. 2 is an enlarged cross-section of a second embodiment of the barrier material of the invention.

FIG. 2 shows a second embodiment of the bio-based, high-barrier packaging material 22 of the invention. As in the first embodiment, the material 22 includes a paper or paperboard substrate 12, a nano pigment coating 14 on the print side and a metalized PLA film 16 laminated with bonding layer 18 on the back side of the substrate. Optionally, a metalized cellophane film can be used in lieu of the metalized PLA film. In the second embodiment, the print side of the material 22 additionally includes a polyethylene terephthalate ("PET")

emulsion based top coat 24. Top coat 24 is preferably applied at a coat weight of about 1 to about 3 pounds per 3,000 square foot ream, and more preferably about 3 pounds. Optionally, a PET emulsion coating can also be applied to the back side of the substrate prior to lamination of the metalized film. Suitable PET emulsions include PHB 55, Evcote PHB-9, PBC-14-450 & PBC 15-451, available from Akzo Noble Functional Chemicals GmbH & Co. KG, Liebigstrasse 7, D-07973 Greiz, Germany.

One or more alternate top coating 24 may be applied over coating 14 on the print side of the packaging material to improve printing characteristics or other properties of the packaging material, as will be apparent to persons skilled in the art.

Figure 3:
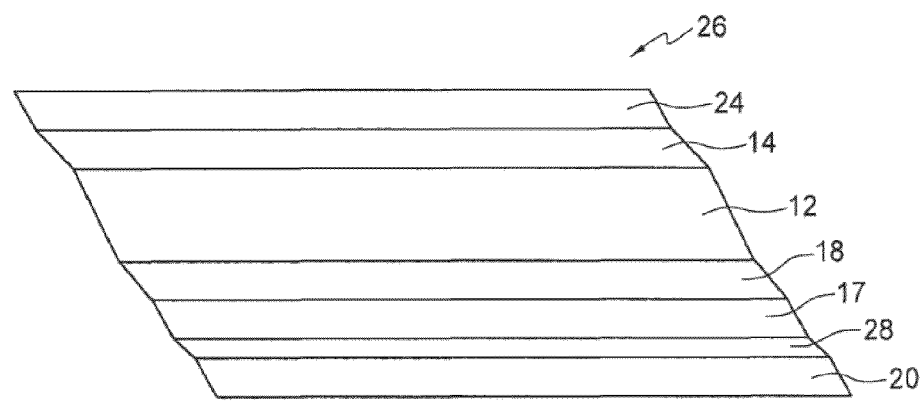
FIG. 3 is an enlarged cross-section of a third embodiment of the barrier material of the invention.

FIG. 3 shows a third embodiment of the bio-based, high-barrier packaging material 26 of the invention. As in the second embodiment, the material 26 includes a paper or paperboard substrate 12, a nano pigment print side coating 14, an optional PET emulsion based recyclable top coat 24, and a PLA heat seal layer 20. In the third embodiment, a metalized cellophane film 17 is laminated to the substrate with bonding layer 18, which can be an adhesive as described above. The metalized cellophane film has a caliper of about 0.92 mils and attains a dyne level between about 42 to 55 dynes after corona treatment. The metalized cellophane film 17 and the PLA seal layer 20 are extrusion laminated together with an extruded tie layer 28 there between. The composition of the tie layer is formulated to provide a good bond between the cellophane film and PLA heat seal layer. Other means may be used to achieve an acceptable bond between the cellophane film and PLA heat seal layer.

Alternatively, a cellophane film with one side metalized and the other side having a heat seal coating can be used. A suitable heat seal coated, metalized film is Nature Flex, 90E-NE available from Innovia Films, Inc., of Atlanta, Ga. If such a film is used, layers 28 and 20 are unnecessary. The metalized cellophane film can be heat sealed to itself or another compatible packing material layer. However, the seal strength achieved in the FIG. 3 embodiment described above is superior and preferred.

Figure 4:
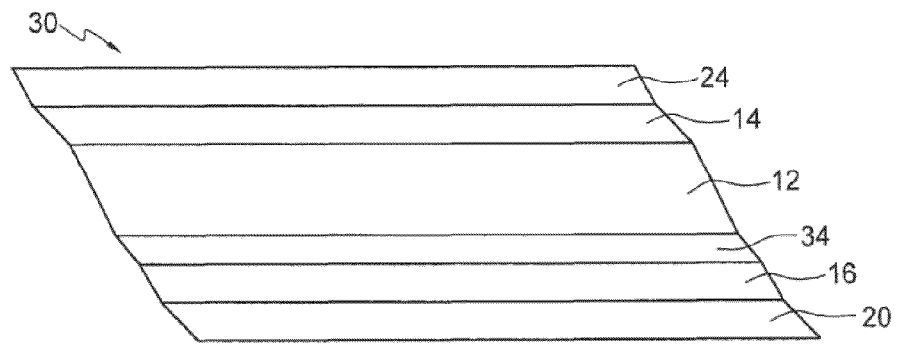
FIG. 4 is an enlarged cross-section of a fourth embodiment of the barrier material of the invention.

FIG. 4 shows a fourth embodiment of the bio-based, high-barrier packaging material 30 of the invention. As in other embodiments, material 30 includes a paper or paperboard substrate 12 with one or more print side coatings 14 and 24. The first down print side coating 14 preferably includes a nano pigment or a mixture of such pigments and one or more binders as described above. The top coat 24 on the print side is preferably a PET emulsion as described above in embodiments two and three. Alternatively, the top coat can be a second nano pigment coating, or a conventional print receptive coating. On the back side of substrate 12, a metalized PLA film 16 is extrusion laminated to the substrate 12 with a tie layer 34 as the bonding layer. A heat seal PLA layer 20 is extrusion laminated onto the outer side of the metalized PLA film 16.

Figure 5:
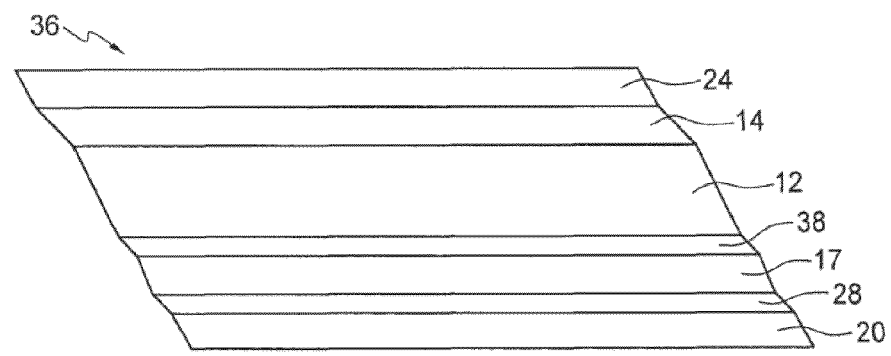
FIG. 5 is an enlarged cross-section of a fifth embodiment of the barrier material of the invention.

FIG. 5 shows a fifth embodiment of a bio-based, high-barrier packaging material 36 in accordance with the invention. As in other embodiments, the material 36 includes a paper or paperboard substrate 12, a nano pigment coating 14 on the print side, an optional top coat 24 on the print side, a PLA heat seal layer 20 on the back side. The packaging material 36 of the fifth embodiment further includes a metalized cellophane film 17 extrusion laminated with a tie layer 38 to the substrate. PLA heat seal layer 20 is extrusion laminated to the outer or back side of the metalized cellophane film 17.

In any of the forgoing embodiments, an optional backside coating can be applied to the substrate 12 before lamination of the metalized film. A preferred backside coating is a PET emulsion. Alternatively, a nano clay coating composition with the formulation of coating layer 14 can be used.

Figure 6:
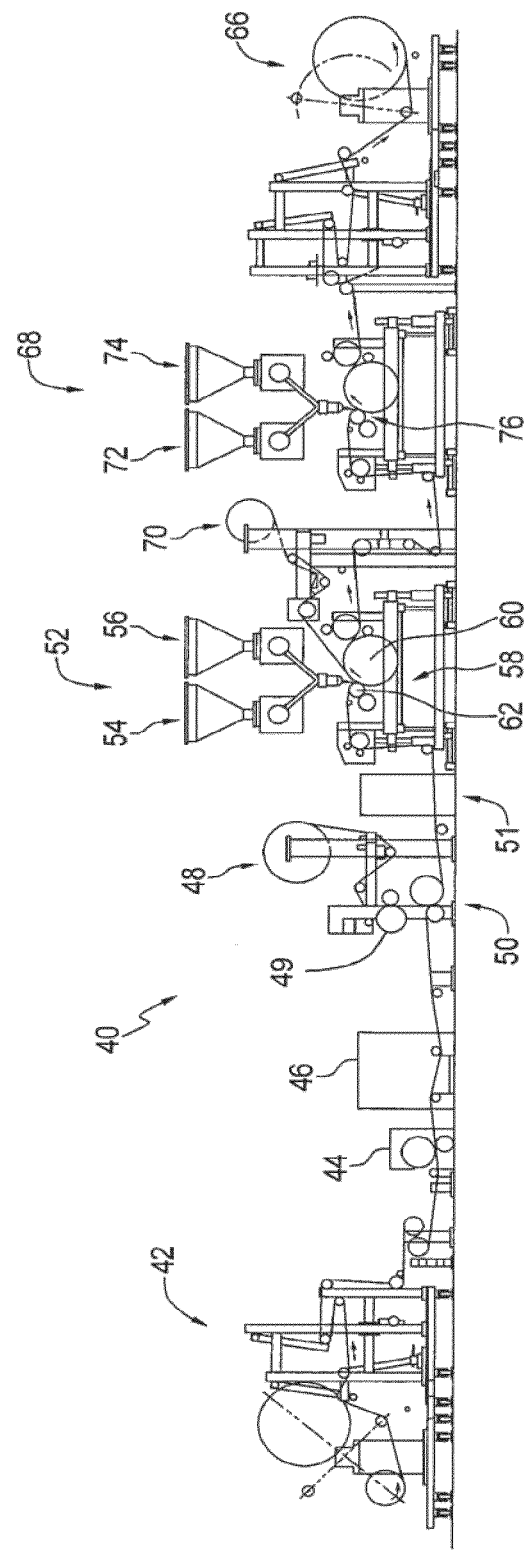
FIG. 6 is a schematic drawing of a laminating apparatus for making the product embodiments of the invention.

FIG. 6 shows an extrusion laminating apparatus 40 for manufacturing the various product embodiments of the invention. Those skilled in the art will appreciate that the apparatus can be substantially simplified for manufacturing only particular embodiments. Further, it will be appreciated that other apparatus may be used to manufacture the products of the invention. The apparatus of FIG. 6 should not be viewed as limiting the scope of the product claims presented hereinafter.

The first and second embodiments 10, 20 of the invention are manufactured as follows. Coated substrate 12 is unwound at first unwind station 42. Bonding layer 18, in this example an adhesive for dry lamination, is applied to the back side of the substrate at adhesive applicator 44. The adhesive coating is dried at station 46. Metalized PLA film 16 is unwound from second unwind 48 and is dry laminated at adhesive laminator station 50. Alternatively and more preferably the adhesive can be applied to the metalized side of film 16 and then laminated to the substrate. Further, the adhesive coated, metalized side of the film can optionally and preferably be corona treated to increase the surface energy of the film prior to lamination. The web is then conveyed to a first extrusion laminator station 52. Station 52 comprises a first extruder 54, an optional second extruder 56, and a press nip 58 between a chill roll 60 and nip roll 62. PLA heat seal layer 20 is extruded from extruder 54 and laminated at 58 on to the exterior side of metalized film 16. The product is completed at this point and is wound at winder 66. In the case of the first and second embodiments the second tandem extruder 68 is not required.

Wet lamination can alternately be used in lieu of dry lamination. If wet lamination is employed, adhesive 18 is applied to the metalized side of film 16 at adhesive applicator 49 and proceeds to laminating station 50 were the film is laminated to the substrate 12. Next, the laminated web is dried at optional drier station 51 prior to proceeding to extrusion laminator 52. In the wet lamination process, applicator 44 and drier 46 are not required.

The third product embodiment 26 of the invention is manufactured as follows. Coated substrate 12 is unwound at first unwind station 42. Bonding layer 18, such as an adhesive, is applied to the back side of the substrate at adhesive applicator 44. As with the first two embodiments, metalized cellophane film 17 is unwound from second unwind 48 and is laminated to the substrate at adhesive laminator station 50. The web is then conveyed to an extrusion laminator station 52. A tie layer 28 is extruded from the first extruder 54 and a PLA heat seal layer 20 is extruded from second extruder 56 and is laminated at 58 over the exterior sided of metalized film 17. The product is completed at this point and is wound at winder 66.

The fourth product embodiment 30 of the invention does not utilize adhesive lamination and accordingly the adhesive laminating section, 44, 46, 49, 50, 51 are not required. Coated substrate 12 is unwound at first unwind station 42. The substrate proceeds to extrusion laminator station 52. Metalized PLA film 16 is unwound from third unwind 70. Tie layer 34 is extruded from first extruder 54, and metalized film 16, tie layer 34 and substrate 12 are laminated at 58. The laminated web then proceeds to second extrusion laminator 68. Laminator 68 includes one or more extruders 72, 74 and a laminating nip 76 as previously described with respect to extrusion laminator 52. PLA heat seal layer 20 is extruded from one of extruders 72, 74 and is laminated to exterior side of the metalized film 16. The laminated product is then wound at winder 66.

The fifth product embodiment 36 of the invention, as with the fourth embodiment, does not utilize adhesive lamination. Coated substrate 12 is unwound at first unwind station 42. The substrate proceeds to first extrusion laminator station 52. Metalized cellophane film 17 is unwound from third unwind station 70. A tie layer 34 is extruded from the first extruder 54 and the metalized film 17, tie layer 34 and substrate 12 are laminated at 58. The laminated web then proceeds to second extrusion laminator 68. Tie layer 28 is extruded from third extruder 72 and PLA heat seal layer 20 is extruded from the fourth extruder 74 and is laminated at 76 to exterior side of metalized film 17. The laminated product is then wound at winder 66.

Data showing paper porosity and permeability modifications through nano pigment and formulated coatings on the preferred substrate 12 with nano pigment coating 14, but without any back side coatings or laminated film is shown in Table 1. The control sample is a commercially available paper substrate, Glazewrap paper available from NewPage Corp., of Stevens Point, Wis.

calculations based on mercury poresymetry techniques conducted under vacuum on the paper substrates created in our examples.

Figure 8:
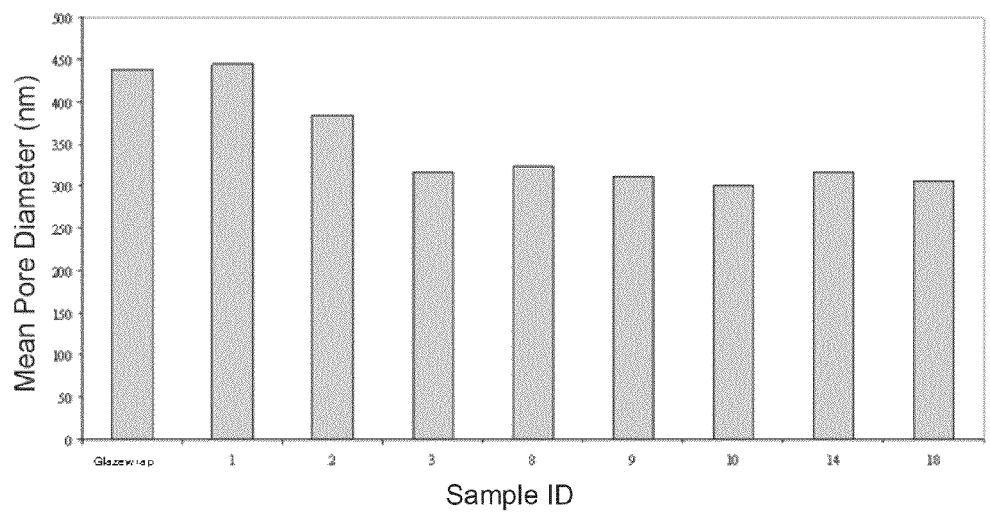
FIG. 8 is a graph showing the mean pore diameter of each of the samples.

The mean pore diameter of the samples is shown in FIG. 8. As shown in FIG. 8, a control sample of the substrate, Glazewrap paper was also compared.

Figure 9:
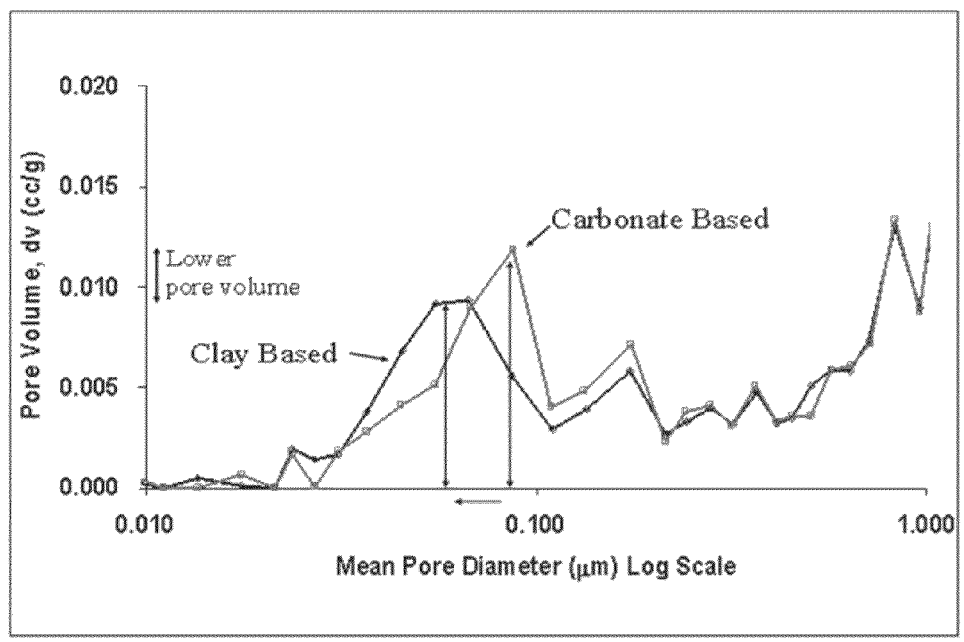
FIG. 9 is a graph showing the relationship between the mean pore diameter and the pore volume, with respect to using a clay based sample versus a carbonate based sample.

It is also apparent that there is a relationship between the mean pore diameter and the pore volume, with respect to using a clay based sample versus a carbonate based sample. By varying the choice of pigments, the pore size distribution and void volume of the coatings can be altered. Thus, the coating type has an effect on the coating void volume and the coating pore size distribution to improve the water vapor transmission rate, as set forth in FIG. 9.

Examples of various constructions for the present packaging materials are listed in Table 2:

TABLE 1

| | | Sample ID | | | | | | | | |
|---|---|---|---|---|---|---|---|---|---|---|
| | | Control | 1 | 2 | 3 | 8 | 9 | 10 | 14 | 18 |
| Total Porosity (%) | Mean | 29.5 | 34.9 | 31.4 | 34.3 | 35.3 | 35.1 | 36.2 | 28.3 | 33.4 |
| | 90% Conf. | 0.7 | 3.2 | 4.3 | 0.3 | 1.3 | 0.7 | 0.6 | 1.9 | 3.0 |
| Pore Tortuosity | Mean | 1.90 | 1.84 | 1.87 | 1.84 | 1.83 | 1.83 | 1.82 | 1.91 | 1.85 |
| | 90% Conf. | 0.01 | 0.04 | 0.05 | 0.00 | 0.01 | 0.01 | 0.01 | 0.02 | 0.03 |
| Permeability (neglecting tortuosity effects, $nm^2$) | Mean | 0.18 | 0.23 | 0.15 | 0.11 | 0.12 | 0.11 | 0.10 | 0.09 | 0.10 |
| | 90% Conf. | 0.08 | 0.19 | 0.06 | 0.08 | 0.08 | 0.07 | 0.03 | 0.02 | 0.02 |
| Permeability (accounting for tortuosity effects, $nm^2$) | Mean | 0.19 | 0.24 | 0.15 | 0.12 | 0.13 | 0.12 | 0.11 | 0.09 | 0.11 |
| | 90% Conf. | 0.08 | 0.20 | 0.06 | 0.08 | 0.09 | 0.08 | 0.03 | 0.02 | 0.02 |
| Mean Pore Diameter (nm) | Mean | 439 | 445 | 384 | 317 | 323 | 310 | 301 | 316 | 307 |
| | 90% Conf. | 92 | 207 | 101 | 114 | 124 | 104 | 47 | 25 | 42 |
| Total Intruded Volume (cc/g) | Mean | 0.36 | 0.32 | 0.26 | 0.26 | 0.31 | 0.29 | 0.28 | 0.25 | 0.27 |
| | 90% Conf. | 0.01 | 0.02 | 0.11 | 0.03 | 0.00 | 0.03 | 0.02 | 0.03 | 0.03 |
| Total Surface Area ($m^2/g$) | Mean | 3.4 | 3.1 | 2.8 | 3.4 | 3.9 | 3.7 | 3.7 | 3.2 | 3.6 |
| | 90% Conf. | 0.6 | 1.4 | 1.9 | 1.6 | 1.5 | 1.6 | 0.8 | 0.1 | 0.8 |
| Bulk Density (g/cc) | Mean | 0.81 | 1.11 | 1.21 | 1.30 | 1.14 | 1.23 | 1.31 | 1.11 | 1.24 |
| | 90% Conf. | 0.02 | 0.05 | 0.34 | 0.17 | 0.05 | 0.13 | 0.06 | 0.04 | 0.03 |
| Apparent Density (g/cc) | Mean | 1.15 | 1.70 | 1.76 | 1.98 | 1.76 | 1.90 | 2.05 | 1.56 | 1.86 |
| | 90% Conf. | 0.04 | 0.15 | 0.39 | 0.27 | 0.12 | 0.23 | 0.08 | 0.02 | 0.07 |

Figure 7:
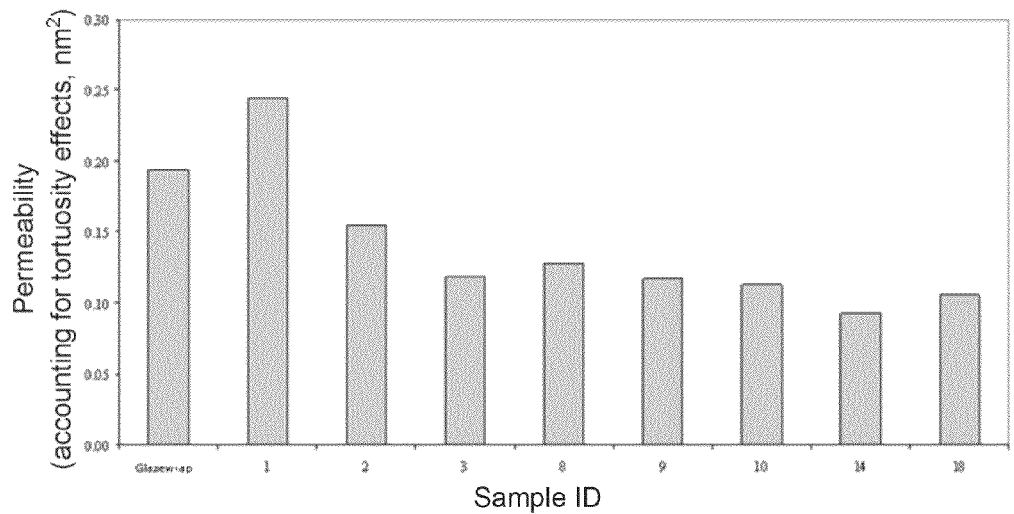
FIG. 7 is a graph showing the permeability of each of the samples.

The permeability of each of the samples, accounting for the effects of tortuosity is shown in FIG. 7. Permeability refers to

TABLE 2

| | | Adhesive Lamination ~3-10 microns | Extrusion Lamination PLA | Extrusion Tie Layer ~0.5-1 microns | Film Met. PLA | Film Met. Cellophane | Extrusion Tie Layer ~0.5-1 microns | PLA Seal layer, ~2 microns |
|---|---|---|---|---|---|---|---|---|
| 1 | Pouch Base | Yes (R&H) | No | No | Yes | | Only if necessary | Yes |
| 2 | Pouch Base | No | Yes | Yes | Yes | | Only if necessary | Yes |
| 3 | High-barrier Biodegradable Protein/PVA Base/Clay | No | Yes | | Yes | | Only if necessary | Yes |
| 4 | High-barrier Biodegradable Protein PVA Base/Talc | No | Yes | | Yes | | Only if necessary | Yes |
| 5 | High-barrier Biodegradable Protein/PVA Base/Clay (Supered) | No | Yes | | Yes | | Only if necessary | Yes |

TABLE 2-continued

| | Adhesive Lamination ~3-10 microns | Extrusion Lamination PLA | Extrusion Tie Layer ~0.5-1 microns | Film Met. PLA | Film Met. Cellophane | Extrusion Tie Layer ~0.5-1 microns | PLA Seal layer, ~2 microns |
|---|---|---|---|---|---|---|---|
| 6 High-barrier Biodegradable Protein PVA Base/Talc (Supered) | No | Yes | | Yes | | Only if necessary | Yes |
| 7 Very high-barrier 8879/PVA/ nanoClay Precoat/PBH55 Top Coat | No | Yes | | Yes | | Only if necessary | Yes |
| 8 Very high-barrier 8879/PVA/ hyperplaty Talc Precoat/PBH55 Top Coat | No | Yes | | Yes | | Only if necessary | Yes |
| 9 Pouch Base | Yes (R&H) | | Yes | | Yes | Only if necessary | Yes |
| 10 Pouch Base | No | | Yes | | Yes | Yes | Yes |

EXAMPLE 1

A bio-based, high-barrier packaging material was formed in accordance with the second embodiment of the invention, described above. The substrate 12 was Glazewrap paper, available from NewPage Corp. of Stevens Point, Wis., which had a basis weight of about thirty pounds per ream. A coating 14 for the print side included a styrene butadiene latex (Latex No. 8879 from Dow Chemicals, Inc. of Midland, Mich.), a polyvinyl alcohol (Celvol 24-203, available from Celanese of Dallas, Tex.) and a pigment comprising substantially 100% hyperplaty nano talc (available from Rio Tinto Minerals of Centennial, Colo.). The coating 14 was applied at a coat weight of about seven pounds per ream. In addition, a top coat 24 of a recyclable, waterborne PET emulsion was applied onto the coating 14 at a coat weight of about three pounds per ream. The PET emulsion based top coat 22 was PBH 55, available from Eka Chemicals, Inc. of Marietta, Ga.

The packaging material further included a metalized PLA film 16 laminated with high-barrier adhesive 18 to the back side of substrate 12. A water-based adhesive available from Rohm & Haas, Aqualam 444A-CR100, was used as the laminating adhesive and laminated at two pounds per ream. The metalized PLA film 16 was about a 1 millimeter film with about a 22,100 inches$^2$/lb yield. About a 1.5 millimeter thick PLA heat seal layer 20 was extrusion laminated on the back side of the metalized PLA film 64.

EXAMPLE 2

A bio-degradable, high-barrier packaging material was formed of substantially the same structure as the material of Example 1, however a metalized cellophane film replaced the metalized PLA film. The metalized cellophane film had about a 0.92 millimeter thickness with about a 21,000 inches$^2$/lb yield. About a 1.5 millimeter thick PLA heat seal layer was extrusion laminated on the back side onto the metalized cellophane film.

EXAMPLE 3

An alternative bio-degradable, high-barrier packaging material was formed in accordance with the second embodiment of the invention, described above. The substrate 12 was Glazewrap paper, available from NewPage Corp. of Stevens Point, Wis., which had a basis weight of about thirty pounds per ream. A coating 14 for the print side included a latex, a polyvinyl alcohol and a pigment comprising 100% hyperplatey nano talc. Coating 14 was applied at a coat weight of about seven pounds per ream. The latex, polyvinyl alcohol and hyperplatey nano talc were those used as above in Example 1. A top coat 24 was also applied at a coat weight of about three pounds per ream on the print side, comprising a soy polymer protein, a polyvinyl alcohol and a hyperplatey nano talc. The soy polymer protein was Pro Cote 200 available from The Solae Company, St. Louis, Mo., the polyvinyl alcohol used was Celvol 24-203, available from Celanese of Dallas, Tex., and the hyperplatey nano talc used was available from Rio Tinto Minerals of Centennial, Colo.

The packaging material further included a metalized PLA film 16 laminated with high-barrier adhesive 18 to the back side of substrate 12. The water based adhesive from Example 1 was used as the laminating adhesive 18 and laminated at two pounds per ream. The metalized PLA film 16 was about a 1 millimeter film with about a 22,100 inches$^2$/lb yield. About a 1.5 millimeter thick PLA heat seal layer 20 was extrusion laminated to the back side of the metalized PLA film 16.

EXAMPLE 4

A bio-degradable, high-barrier packaging material was formed of substantially the same construction as Example 3, however a metalized cellophane film replaced the metalized PLA film. The metalized cellophane film was about 0.92 millimeter thick with about a 21,000 inches$^2$/lb yield. A 1.5 millimeter thick PLA heat seal layer 20 was extrusion laminated onto the back side of the metalized cellophane film.

EXAMPLE 5

A bio-degradable, high-barrier packaging material was formed in accordance with the second embodiment of the invention, described above. The substrate 12 was Glazewrap paper, available from NewPage Corp. of Stevens Point, Wis., which had a basis weight of about thirty pounds per ream. A coating 14 for the print side included a soy polymer protein, a polyvinyl alcohol and a pigment comprising substantially 100% hyperplaty nano talc and was applied at a coat weight of about seven pounds per ream. The soy polymer protein used was Pro Cote 200, available from The Solae Company, St. Louis, Mo. The polyvinyl alcohol and hyperplatey nano talc were those used above in Example 1. In addition, a top coat 24 on the print side included a soy polymer protein, a polyvinyl alcohol and a hyperplatey nano talc and was applied at a coat weight of about three pounds per ream. The soy polymer protein was Pro Cote 200 available from The Solae Company, St. Louis, Mo. The polyvinyl alcohol and the hyperplatey nano talc were the same as those as used in Example 1.

The packaging material further included a metalized PLA film 16 laminated with high-barrier adhesive 18 to the back side of substrate 12. The water based adhesive from Example 1 was used as the laminating adhesive 18 and applied at two pounds per ream. The metalized PLA film 16 was about a 1 millimeter film with about a 22,100 inches$^2$/lb yield. About a 1.5 millimeter thick PLA heat seal layer 20 was extrusion laminated on the back side onto the metalized PLA film 16.

EXAMPLE 6

Yet another bio-degradable, high-barrier packaging material was formed having substantially the same structure as Example 5, however a metalized cellophane film replaced the metalized PLA film. In addition, the protein based coating 14 replaced with a latex based coating. Coating 14 included a latex (Latex 8879 from Dow Chemical), a polyvinyl alcohol and a pigment comprising substantially 100% hyperplatey nano talc and was applied to the print side of substrate 12 with a coat weight of about seven pounds per ream. The metalized cellophane film was about a 0.92 millimeter film with about a 21,000 inches$^2$/lb yield. About a 1.5 millimeter thick PLA heat seal layer was extrusion laminated onto the metalized cellophane film.

EXAMPLE 7

A bio-degradable, high-barrier packaging material was formed in accordance with the second embodiment of the invention, described above. The substrate 12 comprised a #35 Coated Pointflex pouch base, available from NewPage Corp. of Stevens Point, Wis. The print side of the pouch base included a nano pigment coating layer 14 and a top coat 24.

The packaging material further included a metalized PLA film 16 laminated with a high-barrier adhesive 18 to the substrate 12. The water based adhesive from Example 1 was used as the laminating adhesive 18 and applied at two pounds per ream. The metalized PLA film 16 was about a 1 millimeter film with about a 22,100 inches$^2$/lb yield. About a 1.5 millimeter thick PLA heat seal layer 20 was extrusion laminated onto the metalized PLA film 16.

EXAMPLE 8

A bio-degradable, high-barrier packaging material was formed having substantially the same structure as Example 7, although a metalized cellophane film replaced the metalized PLA film. The metalized cellophane film was about a 0.92 millimeter film with about a 21,000 inches$^2$/lb yield. About a 1.5 millimeter thick PLA heat seal layer 20 was extruded onto the metalized cellophane film.

While a particular embodiment of the present packaging materials have been described herein, it will be appreciated by those of ordinary skill in the art that changes and modifications may be made thereto without departing from the invention in its broader aspects and as set forth in the following claims.

What is claimed is:

1. A bio-degradable packaging material having a water vapor transmission rate of less than 0.3 grams per 100 square inches per day at tropical conditions comprising:
    a paper substrate having a print side and a back side, wherein said substrate comprises a combination of separately refined softwood and hardwood pulps, said substrate having a permeability of less than about 0.25 nm$^2$ and a total porosity of less than about 30%, the print side having a machine glaze;
    a coating layer on said print side of said substrate, the coating comprising one or more pigments and at least one binder, wherein at least 25% by dry weight of said one or more pigments are nano pigments of clay, talc or a mixture thereof having a particle size no greater than 90 nanometers and an aspect ratio of 90:1 or greater, and wherein the at least one binder is a protein and polyvinyl alcohol; a latex and polyvinyl alcohol; ethylene acrylic acid and polyvinyl alcohol; or ethylene acrylic acid and a latex;
    a metalized film layer laminated to the back side of said substrate, wherein said metalized film layer is a metalized polylactic acid film or a metalized cellophane film;
    a bonding layer between said substrate and said metalized film layer wherein said bonding layer is an adhesive, a polylactic acid resin layer, an extruded tie layer, or combinations thereof; and
    a polylactic acid heat seal layer over said metalized film layer.

2. The bio-degradable packaging material of claim 1 further comprising a PET emulsion top coat layer applied over said nano pigment coating layer.

3. The bio-degradable packaging material of claim 1 further comprising a print receptive top coat applied over said nano pigment coating layer.

4. The bio-degradable packaging material of claim 1 wherein said metalized film layer is adhesive laminated to the substrate and the adhesive comprises polylactic acid resin.

5. The bio-degradable packaging material of claim 1 further comprising a PET emulsion coating between the back side of said substrate and said metalized film layer.

6. The bio-degradable packaging material of claim 1 wherein said substrate comprises about 40% softwood pulp, about 56% hardwood pulp, and about 4% base ash.

7. The bio-degradable packaging material of claim 1 wherein the at least one binder comprises the protein and polyvinyl alcohol or the ethylene acrylic acid and polyvinyl alcohol, and wherein the polyvinyl alcohol has a molecular weight of about 26,000 to 34,000 and a degree of polymerization of about 260-340.

8. The bio-degradable packaging material of claim 1 wherein the softwood pulp is refined using a low intensity refining plate specific edge load of about 2.2 W-sec/m, and wherein the hardwood pulp is refined using a low intensity refining plate specific edge load of about 1.54 W-sec/m.

* * * * *